(12) United States Patent
Guo

(10) Patent No.: US 10,931,196 B2
(45) Date of Patent: Feb. 23, 2021

(54) LOAD TRANSIENT AND JITTER OF DC-DC CONVERTER

(71) Applicant: TEXAS INSTRUMENTS INCORPORATED, Dallas, TX (US)

(72) Inventor: Song Guo, Macomb, IL (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/226,292

(22) Filed: Aug. 2, 2016

(65) Prior Publication Data

US 2017/0077812 A1    Mar. 16, 2017

Related U.S. Application Data

(60) Provisional application No. 62/216,449, filed on Sep. 10, 2015.

(51) Int. Cl.
*H02M 3/158* (2006.01)
*H02M 3/156* (2006.01)

(52) U.S. Cl.
CPC .... *H02M 3/158* (2013.01); *H02M 2003/1566* (2013.01)

(58) Field of Classification Search
CPC .................. H02M 3/156; H02M 1/14; H02M 2001/0032; H02M 2003/1566; H02M 3/158; G05F 1/46
See application file for complete search history.

(56) References Cited

U.S. PATENT DOCUMENTS

| 6,157,182 A    * | 12/2000 | Tanaka .................. H02M 3/156 323/284 |
| 7,221,135 B2 * | 5/2007 | Zafarana ............... H02M 3/156 323/241 |
| 2013/0051089 A1* | 2/2013 | Pan ......................... H02M 1/44 363/21.17 |

(Continued)

FOREIGN PATENT DOCUMENTS

| CN | 1040226488 A | 9/2014 |
| CN | 104377958 A | 2/2015 |

OTHER PUBLICATIONS

Office Action for Chinese Patent Application No. 201610800857.0, dated Aug. 28, 2020 13 pages.

(Continued)

*Primary Examiner* — Jue Zhang
*Assistant Examiner* — Henry Lee, III
(74) *Attorney, Agent, or Firm* — Mark Allen Valetti; Charles A. Brill; Frank D. Cimino

(57) ABSTRACT

A circuit includes an inductor that receives a switched input voltage to provide an output for driving a load. A driver circuit drives the switched input voltage to the inductor in response to input pulses. A ramp circuit coupled to the inductor generates a ramp signal emulating current of the inductor. A control circuit generates the input pulses to control the driver circuit based on the ramp signal and the output for driving the load. A transient monitoring circuit monitors the output with respect to a predetermined threshold and adjusts the ramp circuit based on the output relative to the predetermined threshold to control the emulated current of the inductor to facilitate jitter and load transient performance.

24 Claims, 4 Drawing Sheets

(56) References Cited

U.S. PATENT DOCUMENTS

2014/0320104 A1\* 10/2014 Guo .................. H02M 1/14
                                                                                                               323/290
2015/0280556 A1\* 10/2015 Bari .................. H02M 3/156
                                                                                                               323/282
2017/0005647 A1\* 1/2017 Pan .................. H02M 1/44

OTHER PUBLICATIONS

CN1040226488A, Machine Translation, 16 pages.
CN104377958, Machine Translation, 12 pages.

\* cited by examiner

LOAD TRANSIENT AND JITTER OF DC-DC CONVERTER

CROSS-REFERENCE TO RELATED APPLICATION

This application claims the benefit of U.S. Provisional Patent Application 62/216,449, filed on Sep. 10, 2015, and entitled COMPARATOR-CONTROLLED SMOOTH-RAMP-GENERATION FOR IMPROVING JITTER/LOAD TRANSIENT PERFORMANCE IN D-CAP SERIES MODULATIONS, the entirety of which is incorporated by reference herein.

TECHNICAL FIELD

This disclosure relates to integrated circuits and, more particularly, to a circuit and method to improve load transient and jitter performance of a DC-DC converter.

BACKGROUND

Switched-mode direct current to direct current (DC-DC) converters represent a primary category for power supply design. A switched-mode DC-DC converter may exceed ninety percent power conversion efficiency and thus has been widely used to efficiently supply power in all types of electronic devices, such as computers, cell phones, televisions, and so forth. In a switched-mode DC-DC converter, the control loop design determines major performance parameters of the converter such as speed of load transient response, DC accuracy and design cost which includes die size for the converter, and the number of off-chip components, for example. Different control schemes have been developed during the past few decades to improve these parameters. For example, voltage mode control and current mode control schemes have been implemented in many converters due to their performance.

SUMMARY

This disclosure relates to a method and circuit to improve load transient and jitter performance of a DC-DC converter.

In one example, a circuit includes an inductor that receives a switched input voltage to provide an output for driving a load. A driver circuit drives the switched input voltage to the inductor in response to input pulses. A ramp circuit coupled to the inductor generates a ramp signal emulating current of the inductor. A control circuit generates the input pulses to control the driver circuit based on the ramp signal and the output for driving the load. A transient monitoring circuit monitors the output with respect to a predetermined threshold and adjusts the ramp circuit based on the output relative to the predetermined threshold to control the emulated current of the inductor to facilitate jitter and load transient performance.

In another example, a semiconductor device includes a driver circuit that drives a switched input voltage to an inductor in response to input pulses. A ramp circuit receives an input from the inductor to generate a ramp signal emulating current of the inductor. A control circuit generates the input pulses to control the driver circuit based on the ramp signal and an output for driving a load. A transient monitoring circuit monitors the output with respect to a predetermined threshold and adjusts the ramp signal in the ramp circuit based on the output relative to the predetermined threshold. If the output is above the predetermined threshold, the transient monitoring circuit decreases a magnitude of the ramp signal to facilitate load transient performance. If the output is below the predetermined threshold, the transient monitoring circuit increases the magnitude of the ramp signal to mitigate jitter in the control circuit.

In yet another example, a method includes generating a ramp signal that emulates current through an inductor, the inductor being supplied a switched voltage to provide the current through the inductor. The method includes generating input pulses based on the ramp signal and an output for driving a load. The method includes monitoring the output with respect to a predetermined threshold. The method includes adjusting the ramp signal based on the output relative to the predetermined threshold to control the emulated current of the inductor to facilitate load transient and jitter performance.

DETAILED DESCRIPTION

This disclosure relates to circuits, methods and systems to improve performance of a DC-DC converter. For example, a circuit includes an inductor that receives a switched input voltage to provide an output for driving a load. In one example, the inductor can be provided externally to the circuit. In other examples, the inductor can be internal to the integrated circuit (IC). A driver circuit receives an input voltage and drives the switched input voltage to the inductor in response to input pulses (e.g., a pulse width modulated (PWM) signal). A ramp circuit is coupled to the inductor to generate a ramp signal emulating current through the inductor. As the driver circuit provides the switched input voltage, the inductor current ramps up and down during such switching of the input voltage resulting in a current ramp that is emulated by the ramp circuit generating a ramp signal. The circuit utilizes the ramp signal as a compensation and feedback mechanism for an output filter capacitance, which has an effective series resistive (ESR) value. In order that a capacitor with smaller ESR can be employed for filtering in the circuit, the ramp circuit generates a ripple voltage from the inductor current to promote stability in the circuit.

A control circuit generates the input pulses to control the driver circuit based on the ramp signal and the output for driving the load. A transient monitoring circuit monitors the output with respect to a predetermined threshold and adjusts the ramp signal in the ramp circuit based on the output relative to the predetermined threshold to control the emulated current of the inductor to improve load transient and reduce jitter. If the output is above the predetermined threshold, the transient monitoring circuit can decrease a magnitude of the ramp signal to provide fast transient response in the output and related control loops. If the output is below the predetermined threshold, the transient monitoring circuit can increase the magnitude of the ramp signal to mitigate jitter in the control circuit. Both high and low thresholds can be established to account for both positive and negative load transients. For example, if the load transient is above or below either of the high and low thresholds, the size of the ramp signal in the ramp circuit can be dynamically reduced during the transient condition to improve performance in the circuit.

Figure 1:
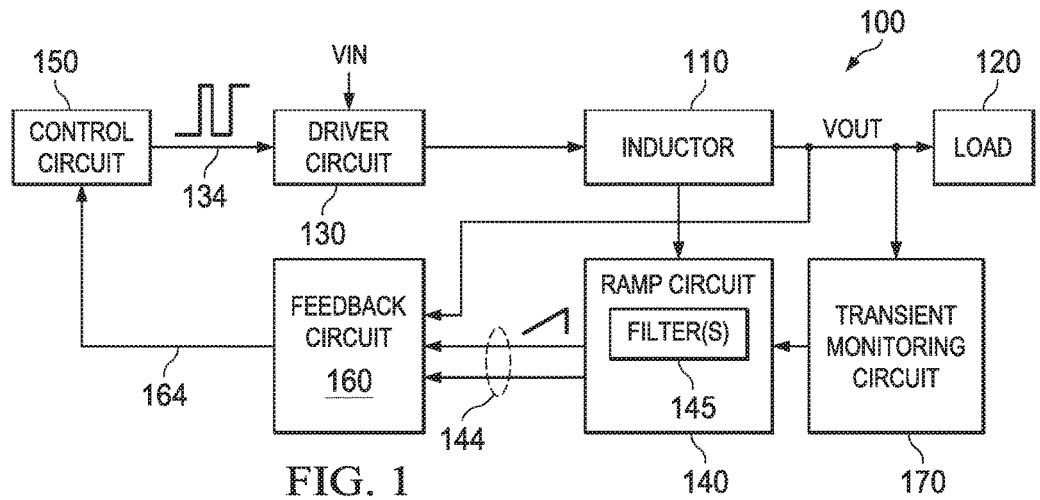
FIG. 1 illustrates an example schematic block diagram of a DC-DC converter circuit with improved stability.

FIG. 1 illustrates an example DC-DC converter circuit 100 to improve transient performance and jitter performance of the converter. As used herein, the term circuit can include a collection of active and/or passive elements that perform a circuit function such as an analog circuit or control circuit, for example. Additionally or alternatively, the term circuit can include an integrated circuit where all and/or some of the circuit elements are fabricated on a common substrate, for example.

As shown in the example of FIG. 1, the circuit 100 includes an inductor 110 that receives a switched input voltage to provide an output VOUT for driving a load 120. A driver circuit 130 drives a switched voltage to the inductor 110 in response to input pulses at 134, which results in corresponding current through the inductor. A ramp circuit 140 coupled to the inductor 110 generates a ramp signal 144 (or signals) emulating current of the inductor 110. A control circuit 150 generates the input pulses 134 to control the driver circuit 130 based on the ramp signal 144 and the output VOUT for driving the load 120. A feedback circuit 160 monitors both VOUT and the ramp signal 144 to generate an error control signal 164 to the control circuit. The control circuit 150 thus controls the input pulses 134 based on the error control signal 164.

A transient monitoring circuit 170 monitors the output VOUT with respect to one or more predetermined thresholds and adjusts the ramp circuit 140 based on the output relative to the predetermined threshold(s) (see, e.g., circuit of FIG. 2 for threshold connections) to control the emulated inductor current that is generated by the ramp circuit 140. The control of the emulated inductor current operates to stabilize the output VOUT. For example, if the output VOUT is above the predetermined threshold, the transient monitoring circuit 170 can decrease a magnitude of the ramp signal to stabilize the output and improve transient load performance. If the output is below the predetermined threshold, the transient monitoring circuit 170 can increase the magnitude of the ramp signal to mitigate jitter in the control circuit 150 (see e.g., jitter waveforms in FIG. 3). Both high and low thresholds can be set up (e.g., be programmable) in the transient monitoring circuit 170 to accommodate both positive and negative load transients. That is, if the load transient is above or below either of the high and low thresholds, the size of the ramp signal 144 from the ramp circuit 140 can be dynamically reduced (e.g., to about 20% of peak ramp signal) during the transient condition to promote stability in the circuit 100. Under normal load conditions, the size of the ramp signal 144 can be dynamically increased (e.g., peak to peak signal value) to reduce jitter in output VOUT.

In some examples, the transient monitoring circuit 170 is configured to monitor the output VOUT for both positive and negative transients. For instance, the transient monitoring circuit 170 determines if the output is above a predetermined threshold (e.g., for positive load transients) or if the output is below a predetermined low threshold (e.g., for negative load transients). If either positive or negative threshold is exceeded, as detected by the transient monitoring circuit 170, the ramp circuit 140 can decrease the size of the ramp signal 144 in response to the detection and during the transient condition to promote stability in the circuit 100.

In one example, the transient monitoring circuit 170 is configured to generate a ramp control signal to control the size of the ramp signal 144 from the ramp circuit 140 in response to the transient monitoring circuit 170 detecting transient signals at the output VOUT. In one example implementation, the ramp circuit 140 generates a count value that is proportional to the size of the ramp signal 144 from the ramp circuit 140 (See, e.g., counter 510 of FIG. 5). The count value can be applied to control a filter 145 in the ramp circuit 140. As an example, the filter 145 can include a variable resistive network that changes an overall resistance value for the network based on the count value.

In some examples, the filter 145 of the ramp circuit 140 can be implemented to include a variable RC filter. In this example, the impedance of the filter 145 can be controlled to adjust of the ramp signal 144 from the ramp circuit 140 in response to the count value from the counter. In another example, the filter 145 can include more than one filter, such as a pair of filters coupled together to provide respective filtered signals to the feedback circuit 160 based on the emulated inductor current. The feedback circuit 160 (e.g., comparator) thus can provide the error signal 164 to the control circuit 150 for generating the input pulses 134 to control the driver circuit 130 based on the signals from the filters 145 of the ramp circuit 140. The feedback circuit 160 monitors the output from each of the filters 145 in the ramp circuit 140 with respect to the output for driving the load 120 and a predetermined threshold to generate the error signal 164 to control the driver circuit 130. At least two levels of dynamic control are provided by the circuit 100 to promote stability in the converter. In one aspect, the ramp signal 144 is maintained at a higher value under normal load conditions to facilitate circuit stability by emulating output filter capacitance ESR value. In another aspect, the magnitude of the ramp signal is dynamically reduced during transient load conditions to reduce jitter in the control circuit 150.

Figure 2:
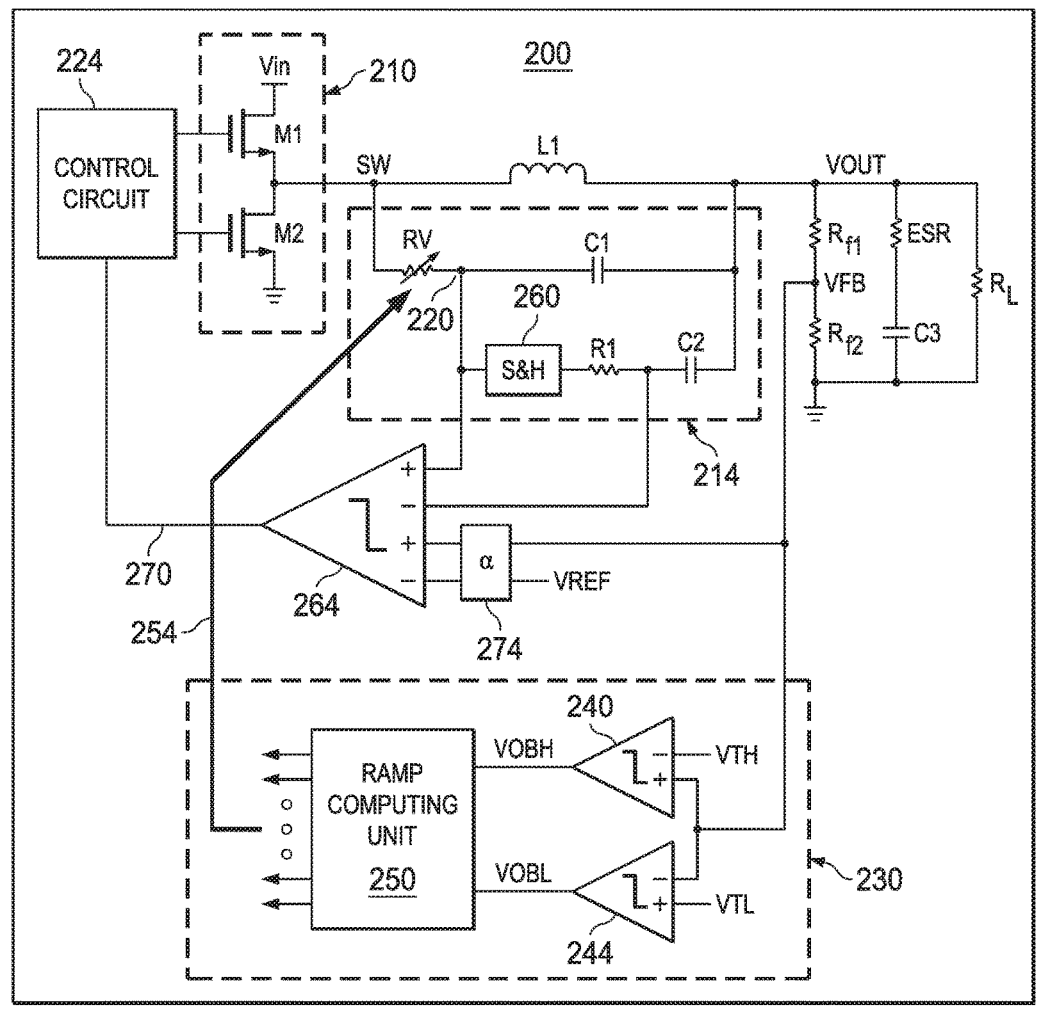
FIG. 2 illustrates an example of an integrated circuit to improve transient performance and jitter of a DC-DC converter.

FIG. 2 illustrates an example of an integrated circuit 200 to improve transient performance and stability of a DC-DC converter. The integrated circuit 200 can be implemented as a semiconductor device that interfaces with external components, including an inductor L1 and an output load, shown as RL. A driver circuit 210 drives a switched input voltage SW to the inductor L1 in response to input pulses from a control circuit 224 and based on an input voltage VIN. A ramp circuit 214 receives an input from the inductor L1 to generate a ramp signal at node 220, which emulates current of the inductor. The control circuit 224 generates the input pulses to control the driver circuit 210 based on the ramp signal at node 220 and an output VOUT for driving the load RL.

A transient monitoring circuit 230 monitors the output VOUT with respect to one or more predetermined thresholds and adjusts the ramp signal at node 220 in the ramp circuit 214 based on the output relative to the predetermined threshold(s). For example, if the output is above a threshold, the transient monitoring circuit 230 decreases a magnitude of the ramp signal at node 220 to stabilize the output. If the output is below another predetermined threshold, the transient monitoring circuit 230 increases the magnitude of the ramp signal to mitigate jitter in the control circuit 224. A resistive divider network that includes resistors RF1 and RF2 samples the output VOUT to provide feedback voltage VFB that is monitored by the transient monitoring circuit 230 (e.g., VFB is proportional to VOUT according to RF1 and RF2).

As shown in the example of FIG. 2, the voltage VFB is monitored by a high comparator 240 with respect to a high threshold VTH and a low comparator 244 monitors voltage VFB with respect to a low threshold VTL within the transient monitoring circuit 230. The high comparator 240 generates a high signal VOBH indicating the voltage VFB is above a predetermined threshold (e.g., above a positive load transient threshold). The low comparator 244 generates a low signal VOBL indicating the voltage VFB is below a predetermined low threshold (e.g., below a negative load transient threshold).

The high signal VOBH and the low signal VOBL from the high comparator 240 and low comparator 244, respectively, of the transient monitoring circuit 230 drive a ramp computing unit 250 that generates a ramp control signal (or signals), shown as arrow 254, to control the ramp signal at 220 in the ramp circuit 214 in response to transient signals detected at the output VOUT. In one example, the ramp computing unit 250 can include a counter that is adjusted based on VOBL and VOBH (see e.g., FIG. 5) to generate a count value that is proportional to the size of the ramp signal at node 220 in the ramp circuit 214. The ramp circuit 214 can include a variable resistor RV (e.g., a resistive switch network) that is controlled from the count value of the ramp computing unit 250. That is, the variable resistor RV changes an overall resistive value RV for the network based on the count value.

As shown in the example of FIG. 2, the ramp circuit 214 can include a capacitor C1 that is in series with the variable resistance RV to form a first filter in the ramp circuit. The first filter thus is an RC filter having a transfer function (e.g., an impedance) that is adjusted (e.g., via setting the variable resistor RV) to control the ramp signal at node 220 in the ramp circuit 214 in response to the count value from the counter.

The ramp circuit 214 can also include a second filter that includes C2 in series with R1 that provides a filtered signal that is sampled by sample and hold circuit 260. The second filter is coupled to the first filter, with the second filter R1 and C2 connected in parallel with C1. Filtered signals from the first and second filter in the ramp circuit 214 are monitored by a comparator 264 to generate an error signal 270 to the control circuit 224. As shown, in addition to monitoring the ramp signal, the comparator 264 can monitor VOUT with respect to a reference VREF, where VOUT and VREF can both be scaled via a scaling factor alpha, indicated at 274. The comparator 264 thus monitors the signals from each of the first and second filters in the ramp circuit 214 with respect to the scaled output VOUT and a predetermined threshold VREF to generate the error signal 270 to the control circuit 224. The control circuit 220 thus generates the input pulses to control the driver circuit 210 based on the error signal 270.

An output capacitor C3 filters the load VOUT, where C3 has an effective series resistance (ESR). In this example, ESR of C3 may be of small value. In many modern circuit applications, it is desirable to reduce ESR of C3 so that output ripple is small. Thus, the ramp signals as described herein can compensate for some of the effects of lower ESR such as increasing stability of the circuit.

Figure 3:
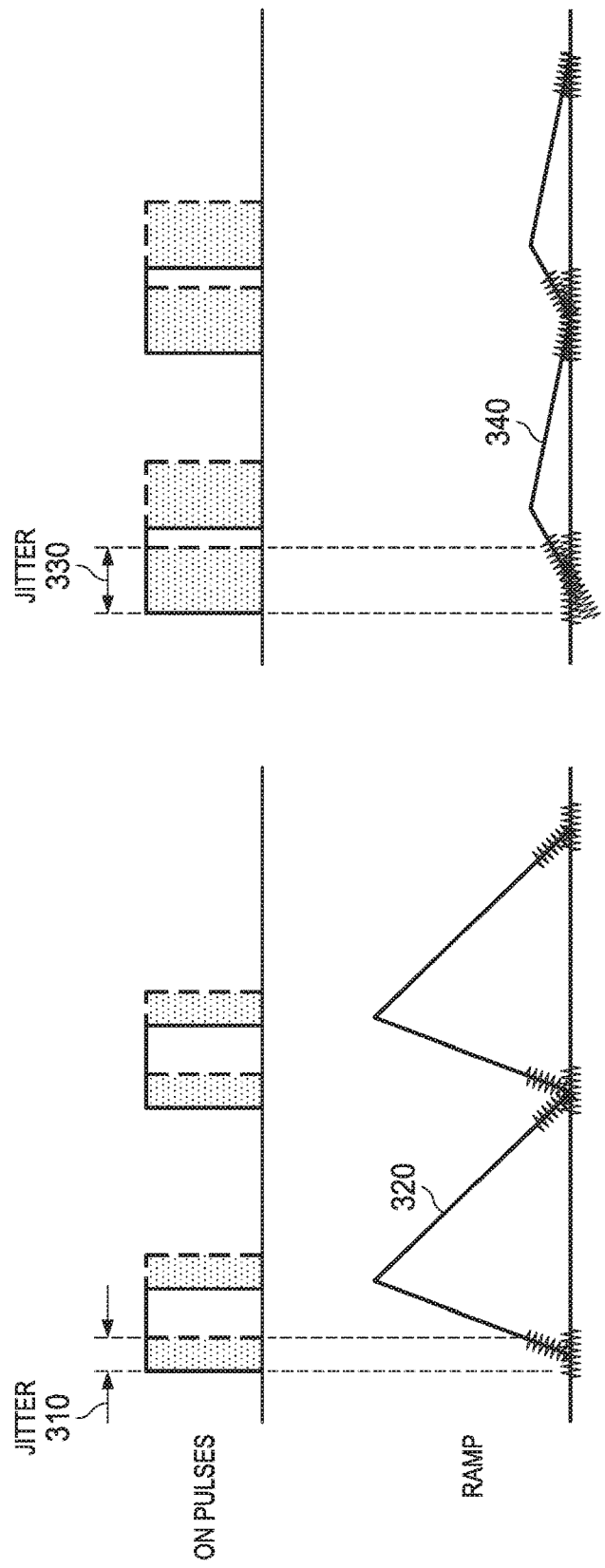
FIG. 3 illustrates an example signal diagram that demonstrates a relationship between ramp signal size and jitter performance of driver circuit drive pulses for a DC-DC converter.

FIG. 3 illustrates example signal diagrams that illustrate a relationship between ramp signal size and jitter performance of driver circuit drive pulses for a DC-DC converter.

As used herein, the term jitter refers to a deviation from an intended periodicity in a respective signal pulse. During periods of low jitter, the ON pulse is relatively stable without much change in pulse width from one driver pulse to another. During periods of high jitter, there is more variation in the ON state which can have the effect of increasing the apparent time of the ON pulse. Such jitter is illustrated in FIG. 3.

For example, as shown at 310, ON pulse jitter is relatively small (in terms of changing pulse width) when a ramp signal as described herein is large, as shown at 320. However, jitter increases, shown at 330, when the ramp signal has a smaller magnitude, such as shown at 340. If the ramp signal is left in its large magnitude state, such as shown at 320, jitter performance can be suitably controlled. However, under load transient conditions, smaller ramp signals such as shown at 340 promote improved load transient performance in the DC-DC converter circuits described herein. Thus, the circuits depicted in FIGS. 1 and 2 dynamically switch between larger ramps when load conditions are stable to reduce jitter in the control signals and provide smaller ramps when transient conditions are detected to improve transient performance.

Figure 4:
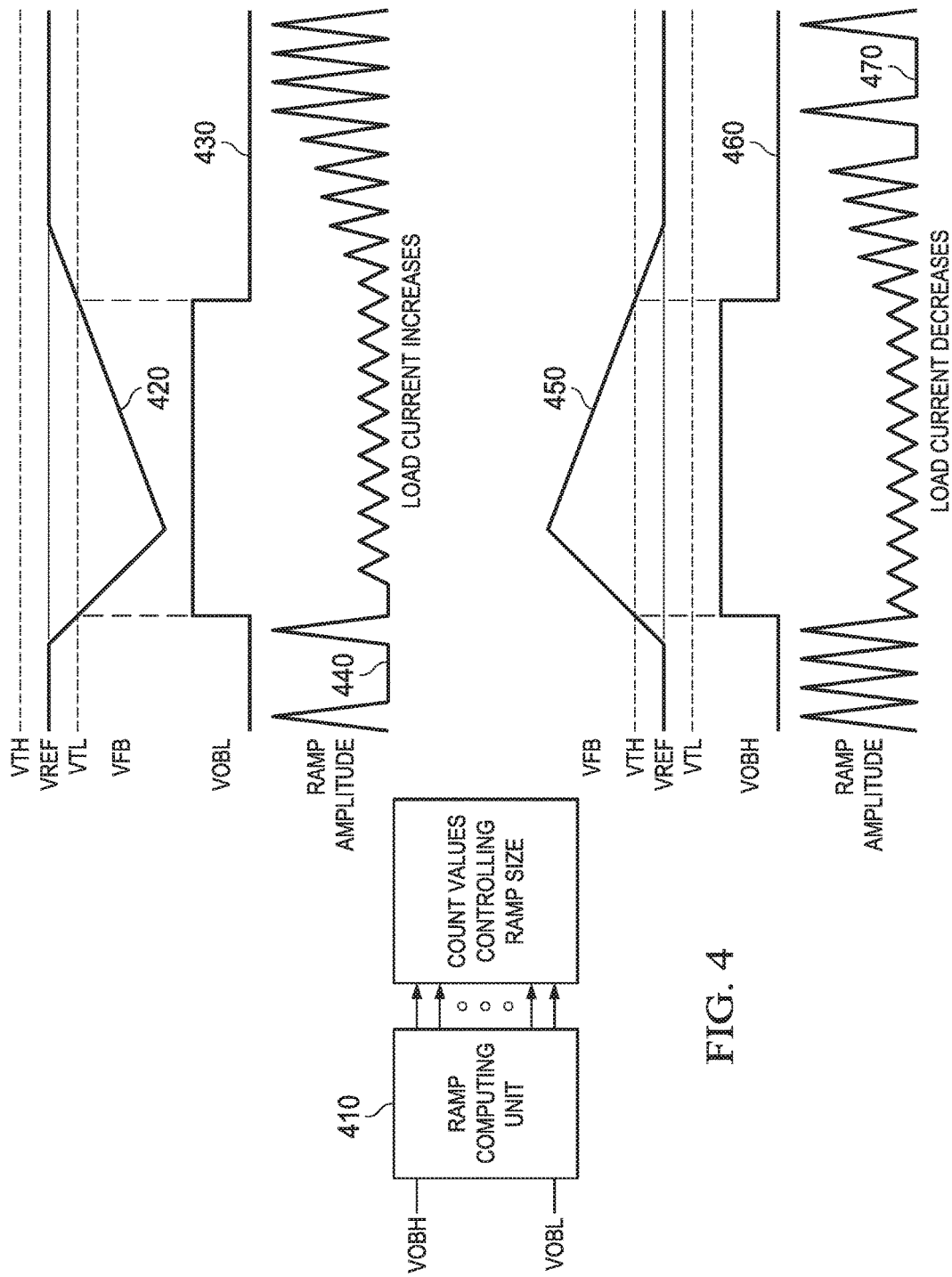
FIG. 4 illustrates another example signal diagram that demonstrates a relationship between load transient performance and ramp signal size for a DC-DC converter.

FIG. 4 illustrates an example signal diagram that illustrates a relationship between load transient performance and ramp signal size for a DC-DC converter (e.g., converter 100 or 200). As shown, output (e.g., counter values) from a ramp computing unit 410 is varied based on signals VOBH and VOBL indicating thresholds have been exceeded via positive or negative load transients described above with respect to FIG. 2. During negative load transients, shown as transient signal 420, which goes below a low threshold level shown by VTL, signal VOBL 430 is asserted during this time. In response to VOBL 430 being asserted, the ramp signal generation from the ramp computing unit 410 decreases (e.g., lower count value), as shown at ramp amplitude signal 440. When the transient at the output returns above VTL, the VOBL is de-asserted and the ramp amplitude returns to its normal operating level.

Similarly, when the load current decreases and when a transient 450 rises above threshold VTH representing positive transient values, signal VOBH 460 is asserted. In response to VOBH 460 being asserted, the ramp computing unit 410 provides counter values to decrease the ramp amplitude signal 470 and remain decreased during the transient condition. When the transient 450 subsides to a level that is below threshold VTH, signal VOBH 460 is de-asserted, and the ramp amplitude increases back to its normal operating level, such as shown. When the load value is in between both VTH and VTL, the ramp amplitude thus can be increased to reduce jitter, such as described herein.

Figure 5:
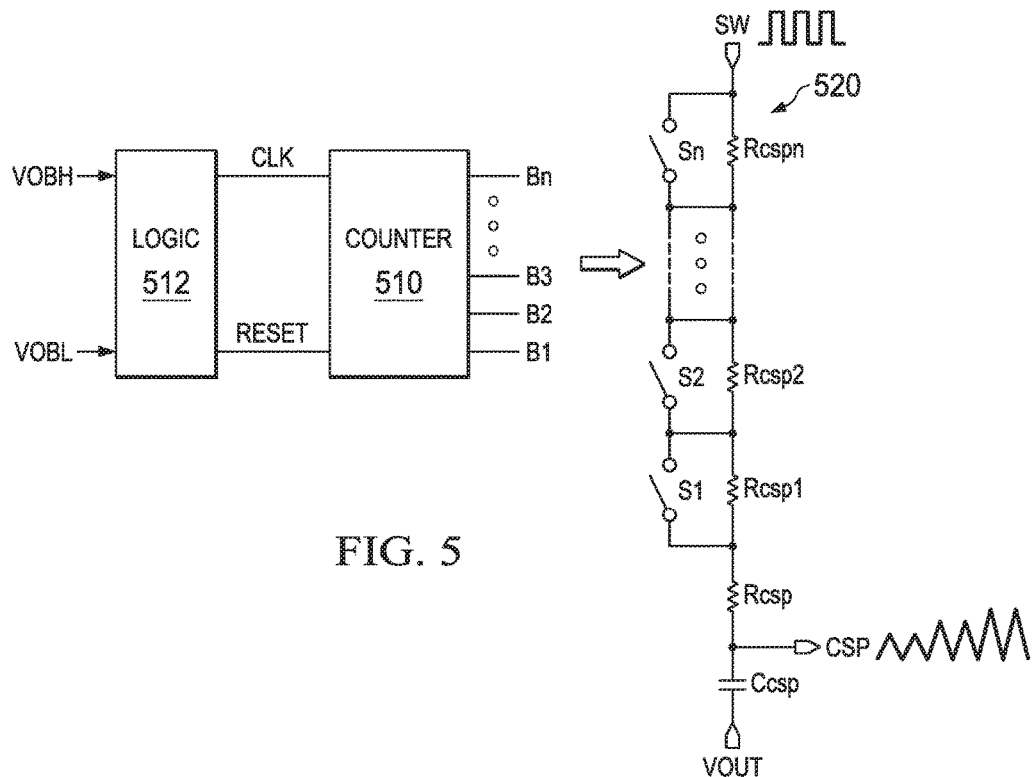
FIG. 5 illustrates an example circuit to adjust a ramp signal for a DC-DC converter.

FIG. 5 illustrates an example circuit to adjust ramp signal size for a DC-DC converter (e.g., converter 100 or 200). A counter 510 represents an example of a ramp computing unit described herein. The counter 510 can be driven via logic block 512 which is driven from control signals VOBH and VOBL described herein. As shown, outputs from the counter 510 can include outputs B1 though BN, with N being a positive integer. Counter outputs from the counter 510 drive a resistive switch network 520 that includes controllable switches S1 through SN to enable or disable series resistance in the network 520. For example, when a respective switch is closed, a resistor disabled, and when the switch is open, the resistor is enabled and inserted in series loop of resistive network. Each of the controllable switches S1 through SN can be controlled via a respective counter output B0 through BN. The resistive switch network 520 can be modeled in the circuit 200 as variable resistor RV in the ramp generation circuit 214, for example.

Figure 6:
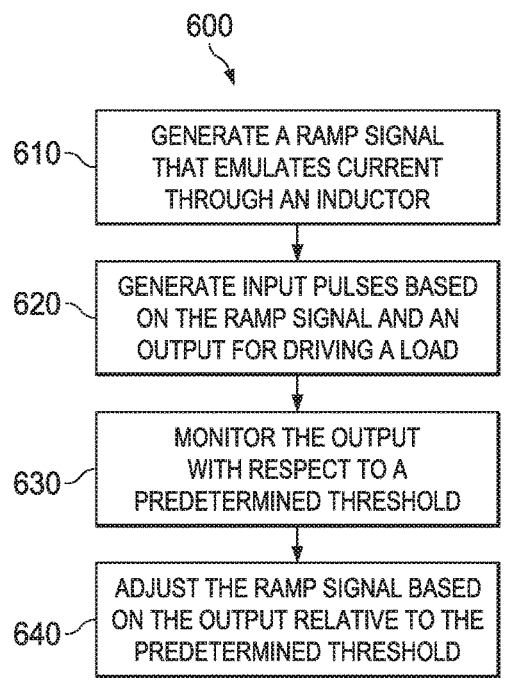
FIG. 6 is a flow diagram that illustrates an example method to improve transient performance and stability of a DC-DC converter.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such methods can be executed by various components configured in an integrated circuit, processor, or a controller, for example.

FIG. 6 illustrates an example method 600 to improve transient performance and jitter of a DC-DC converter. At 610, the method 600 includes generating a ramp signal that emulates current through an inductor, the inductor being supplied a switched voltage to provide the current through the inductor (e.g., via ramp circuit 140 of FIG. 1). At 620, the method 600 includes generating input pulses based on the ramp signal and an output for driving a load (e.g., via the control circuit 180 of FIG. 1). At 630, the method 600 includes monitoring the output with respect to a predetermined threshold to control the emulated current of the inductor to stabilize the output (e.g., via transient monitoring circuit 170 of FIG. 1). At 640, the method 600 includes adjusting the ramp signal based on the output relative to the predetermined threshold to control the ramp signal that emulates current of the inductor to reduce jitter and improve load transient performance (e.g., via transient monitoring circuit 170 of FIG. 1). Although not shown, the method 600 can also include decreasing a magnitude of the ramp signal to stabilize the output if the output is above the predetermined threshold. This can include increasing the magnitude of the ramp signal if the output is below the predetermined threshold.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A circuit, comprising:
a driver circuit configured to provide a switched input voltage to an inductor in response to input pulses;
a ramp computing unit including a counter configured to generate a count value that is proportional to a size of a ramp signal;
a ramp circuit coupled to the inductor to generate the ramp signal emulating current of the inductor, the ramp circuit including a variable resistance that is controlled based on the count value of the counter, the variable resistance to control the ramp signal based on the count value;
a control circuit configured to generate the input pulses to control the driver circuit based on the ramp signal and an output for driving a load; and
a transient monitoring circuit configured to monitor the output with respect to a predetermined threshold and configured to adjust the count value of the counter in response to the output not satisfying the predetermined threshold.

2. The circuit of claim 1, further comprising a resistive divider network that samples the output that is monitored by the transient monitoring circuit.

3. The circuit of claim 1, wherein the transient monitoring circuit further comprises a high comparator and a low comparator that each monitor the output, wherein the high comparator generates a high signal indicating the output is above a predetermined high threshold and the low comparator generates a low signal indicating the output is below a predetermined low threshold.

4. The circuit of claim 3, wherein the ramp computing unit is configured to generate a ramp control signal to control the size of the ramp signal in the ramp circuit in response to transient signals detected at the output based on one of the high or low signals of the transient monitoring circuit.

5. The circuit of claim 1, wherein the variable resistance includes a resistive switch network.

6. The circuit of claim 5, further comprising a capacitor coupled in series with the resistive switch network to form a filter in the ramp circuit, the filter having a transfer function that is adjustable via the resistive switch network to control the size of the ramp signal in the ramp circuit in response to the count value from the counter.

7. The circuit of claim 6, wherein the filter is a first filter, the ramp circuit further comprising a second filter that is coupled with the first filter, wherein signals from the first and second filters in the ramp circuit are monitored by a comparator to generate the input pulses to control the driver circuit.

8. The circuit of claim 7, wherein the comparator monitors the signals from each of the first and second filters in the ramp circuit with respect to the output and a respective threshold to generate the input pulses that control the driver circuit.

9. A semiconductor device, comprising:
a driver circuit configured to provide a switched input voltage to an inductor in response to input pulses;
a ramp computing unit including a counter configured to generate a count value that is proportional to a size of a ramp signal;
a ramp circuit configured to receive an input from the inductor to generate the ramp signal emulating current of the inductor, the ramp circuit including a variable resistance that is controlled based on the count value of the counter, the variable resistance is configured to control the ramp signal based on the count value;
a control circuit configured to generate the input pulses to control the driver circuit based on the ramp signal and an output for driving a load; and
a transient monitoring circuit configured to monitor the output with respect to a predetermined threshold and configured to adjust the count value of the counter in response to the output not satisfying the predetermined threshold:
if the output is above the predetermined threshold, the transient monitoring circuit configured to decrease a magnitude of the ramp signal,
if the output is below the predetermined threshold, the transient monitoring circuit configured to increase the magnitude of the ramp signal.

10. The semiconductor device of claim 9, further comprising a resistive divider network that samples the output that is monitored by the transient monitoring circuit.

11. The semiconductor device of claim 10, wherein the transient monitoring circuit further comprises a high comparator and a low comparator that each monitor the output, wherein the high comparator generates a high signal indicating the output is above a predetermined high threshold and the low comparator generates a low signal indicating the output is below a predetermined low threshold.

12. The semiconductor device of claim 11, wherein the ramp computing unit is configured to generate a ramp control signal to control the size of the ramp signal in the ramp circuit in response to transient signals detected at the output based on one of the high or low signals of the transient monitoring circuit.

13. The semiconductor device of claim 9, wherein the variable resistance includes a resistive switch network.

14. The semiconductor device of claim 13, further comprising a capacitor coupled in series with the resistive switch network to form a filter in the ramp circuit, the filter having a transfer function that is adjustable via the resistive switch network to control the size of the ramp signal in the ramp circuit in response to the count value from the counter.

15. The semiconductor device of claim 14, wherein the filter is a first filter, the ramp circuit further comprising a second filter that is coupled with the first filter, wherein signals from the first and second filters in the ramp circuit are monitored by a comparator to generate the input pulses to control the driver circuit.

16. The semiconductor device of claim 15, wherein the comparator monitors the output from each of the first and second filters in the ramp circuit with respect to the output and a respective threshold to generate the input pulses that control the driver circuit.

17. A method, comprising:
generating, by a counter, a count value that is proportional to a size of a ramp signal;
controlling a variable resistance in a ramp circuit based on the count value;
generating the ramp signal, based on the variable resistance, that emulates current through an inductor, the inductor being supplied a switched voltage to provide the current through the inductor;
generating input pulses, via a controller, based on the ramp signal and an output for driving a load;
monitoring an output with respect to a predetermined threshold; and
adjusting the count value of the counter in response to the output not satisfying the predetermined threshold to control the ramp signal that emulates current of the inductor.

18. The method of claim 17, further comprising:
decreasing a magnitude of the ramp signal to stabilize the output if the output is above the predetermined threshold; and
increasing the magnitude of the ramp signal if the output is below the predetermined threshold.

19. A circuit, comprising:
a driver circuit configured to provide a switched input voltage to an inductor in response to input pulses;
a ramp computing unit including a counter configured to generate a count value that is proportional to a size of a ramp signal;
a ramp circuit coupled to the inductor to generate the ramp signal emulating current of the inductor, the ramp circuit including a resistive switch network coupled in series with a capacitor to form a filter in the ramp circuit, the filter having a transfer function that is adjustable via the resistive switch network to control the size of the ramp signal in the ramp circuit in response to the count value from the counter;
a control circuit configured to generate the input pulses to control the driver circuit based on the ramp signal and an output for driving a load; and
a transient monitoring circuit configured to monitor the output with respect to a predetermined threshold and configured to adjust the ramp circuit based on the output relative to the predetermined threshold.

20. The circuit of claim 19, wherein the filter is a first filter, the ramp circuit further comprising a second filter that is coupled with the first filter, wherein signals from the first and second filters in the ramp circuit are monitored by a comparator to generate the input pulses to control the driver circuit.

21. The circuit of claim 20, wherein the comparator monitors the signals from each of the first and second filters in the ramp circuit with respect to the output and a respective threshold to generate the input pulses that control the driver circuit.

22. A semiconductor device, comprising:
a driver circuit configured to provide a switched input voltage to an inductor in response to input pulses;
a ramp computing unit including a counter configured to generate a count value that is proportional to a size of a ramp signal;
a ramp circuit configured to receive an input from the inductor to generate the ramp signal emulating current of the inductor, the ramp circuit including a resistive switch network coupled in series with a capacitor to form a filter in the ramp circuit, the filter having a transfer function that is adjustable via the resistive switch network to control the size of the ramp signal in the ramp circuit in response to the count value from the counter;
a control circuit configured to generate the input pulses to control the driver circuit based on the ramp signal and an output for driving a load; and
a transient monitoring circuit configured to monitor the output with respect to a predetermined threshold and configured to adjust the ramp signal in the ramp circuit based on the output relative to the predetermined threshold:
if the output is above the predetermined threshold, the transient monitoring circuit configured to decrease a magnitude of the ramp signal,
if the output is below the predetermined threshold, the transient monitoring circuit configured to increase the magnitude of the ramp signal.

23. The semiconductor device of claim 22, wherein the filter is a first filter, the ramp circuit further comprising a second filter that is coupled with the first filter, wherein signals from the first and second filters in the ramp circuit are monitored by a comparator to generate the input pulses to control the driver circuit.

24. The semiconductor device of claim 23, wherein the comparator monitors the output from each of the first and second filters in the ramp circuit with respect to the output and a respective threshold to generate the input pulses that control the driver circuit.

* * * * *